US012015346B2

(12) United States Patent
Barbieri et al.

(10) Patent No.: US 12,015,346 B2
(45) Date of Patent: Jun. 18, 2024

(54) CONTROL LOOP AND EFFICIENCY ENHANCEMENT FOR DC-DC CONVERTERS

(71) Applicant: STMicroelectronics S.r.l., Agrate Brianza (IT)

(72) Inventors: Andrea Barbieri, Casalpusterlengo (IT); Aldo Vidoni, Rho (IT); Marco Zamprogno, Cesano Maderno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 209 days.

(21) Appl. No.: 17/565,674

(22) Filed: Dec. 30, 2021

(65) Prior Publication Data

US 2023/0216405 A1 Jul. 6, 2023

(51) Int. Cl.

*H02M 3/158* (2006.01)
*H02M 1/00* (2006.01)
*H02M 1/08* (2006.01)

(52) U.S. Cl.

CPC ......... *H02M 3/158* (2013.01); *H02M 1/0025* (2021.05); *H02M 1/08* (2013.01)

(58) Field of Classification Search

CPC ...... H02M 3/158; H02M 1/0025; H02M 1/08; H02M 1/0035; H02M 1/0048; H02M 3/157

See application file for complete search history.

(56) References Cited

U.S. PATENT DOCUMENTS 5,180,964 A 1/1993 Ewing
6,163,139 A 12/2000 Symonds
7,755,525 B2 * 7/2010 Nanda .................. H02M 3/157 341/143
7,902,803 B2 3/2011 Peng et al.
8,471,536 B2 6/2013 Wu et al.
9,780,655 B2 * 10/2017 Marsili .................. H02M 3/07

(Continued)

FOREIGN PATENT DOCUMENTS

CN 108258900 B 12/2019

OTHER PUBLICATIONS

Peng H et al: "Digital current-mode controller for DC-DC converters", Applied Power Electronics Conference and Exposition, 2005. APEC 2005. Twentieth Annual IEEE Austin, TX, USA Mar. 6-10, 2005, Piscataway, NJ, USA,IEEE, US, vol. 2, Mar. 6, 2005 (Mar. 6, 2005), pp. 899-905 vol. 2, XP010809342.

(Continued)

*Primary Examiner* — Kyle J Moody
(74) *Attorney, Agent, or Firm* — Crowe & Dunlevy LLC

(57) ABSTRACT

A DC-DC boost converter includes an inductor coupled between an input voltage and an input node, a diode coupled between the input node and an output node, and an output capacitor coupled between the output node and ground such that an output voltage is formed across the output capacitor. A switch selectively couples the input node to ground in response to a drive signal. Control loop circuitry includes an error amplifier to generate an analog error voltage based upon a comparison of a feedback voltage to a reference voltage, the feedback voltage being indicative of the output voltage, a quantizer to quantize the analog error voltage to produce a digital error signal, and a drive voltage generation circuit to generate the drive signal as having a duty cycle based upon the digital error signal.

16 Claims, 8 Drawing Sheets

(56) References Cited

U.S. PATENT DOCUMENTS

| | | | | |
|---|---|---|---|---|
| 10,250,118 | B1 * | 4/2019 | Wang | H02M 3/156 |
| 11,139,734 | B2 | 10/2021 | Abramovici | |
| 11,271,480 | B2 * | 3/2022 | Liang | H03M 3/506 |
| 2008/0284397 | A1 | 11/2008 | Chang | |
| 2014/0002042 | A1 | 1/2014 | Wismar et al. | |

OTHER PUBLICATIONS

EPO Search Report and Written Opinion for counterpart EP Appl. No. 22213961.0, report dated May 8, 2023, 9 pgs.

Vijayalakshmi, Subramanian et al: "Time Domain Based Digital PWM Controller for DC-DC Converter," Automatika, Journal for Control, Measurement, Electronics, Computing and Communications, ISSN 0005-1144, 13 pages.

* cited by examiner

CONTROL LOOP AND EFFICIENCY ENHANCEMENT FOR DC-DC CONVERTERS

TECHNICAL FIELD

This disclosure is directed to the field of DC-DC boost converters and, in particular, to a control loop design for a DC-DC boost converter providing for increased efficiency in voltage conversion.

BACKGROUND

DC-DC boost converters are utilized to step up an input voltage (while stepping down an input current) to produce a high voltage output. One of many uses for DC-DC boost converters is in the driving of piezoelectrically actuated micro-electromechanical systems (MEMS) mirror devices. Devices incorporating MEMS mirror devices may utilize such MEMS mirror devices to scan an incident light beam in a desired scan pattern across a target area.

An example of a known DC-DC boost converter 11 used in a system for driving a MEMS mirror device (e.g., a linearly driven MEMS mirror or a resonance driven MEMS mirror) is shown in FIG. 1. The DC-DC boost converter 11 receives an input voltage Vin through an input inductor L, the input inductor L being connected to node Nn, at which a voltage Vsw is produced during operation. A first diode D1 is connected between node Nn and a first output capacitor C1 across which a first boosted output voltage VBOOSTL is produced. A first switch Sw is connected between node Nn and ground. The first switch Sw is operated by a drive control signal Vdrive. The parasitic capacitance of the switch Sw (which may be an n-channel MOS device) is represented as Cp, and the body diode of the switch Sw is represented as diode D2. A resistive divider is formed by resistors R1 and R2 connected in series between a node No (at which the top plate of capacitor C1 is connected) and ground, with a feedback voltage Vfbk being generated at a tap node N1 between resistors R1 and R2. A control loop circuit 15 receives the feedback voltage Vfbk, and generates the drive control signal Vdrive for the switch Sw based upon the feedback voltage Vfbk.

Operation is now described with additional reference to FIG. 2. During a first time period, the drive control signal Vdrive is asserted to close switch Sw to thereby connect node Nn to ground. As a result, the inductor L is charged, and thus the inductor current Il rises, generating a magnetic field and thereby storing energy in the inductor L. When the drive control signal Vdrive is deasserted at the end of the first time period to open switch Sw, the inductor current L falls, and the strength of the magnetic field collapses as the stored energy is converted to current to attempt to maintain the current output from the inductor L. As a result, the left side of the inductor L goes positive, meaning that the voltage across the inductor L is in series with the input voltage Vin, thereby providing a boosted voltage Vsw at node Nn during the second time period, as can be seen in FIG. 2. As a result, the diode D1 becomes forward biased, and current is delivered to charge capacitor C1, increasing the voltage VBOOST stored on capacitor C1.

Once the inductor L has transferred all its energy, assuming for the moment that diode D2 is not present, the diode D1 becomes reverse biased, and a parasitic resonating LC circuit is formed between the inductor L and the parasitic capacitance Cp across the switch Sw, resulting in voltage and current ringing during a third time period. This ringing would result in energy loss due to the resistance present in the LC circuit.

The diode D2, which has its cathode connected to node Nn and its anode connected to ground is used to alleviate this situation that would otherwise occur. This diode D2 is present when the switch Sw is formed as an n-channel MOS device and is the intrinsic body diode present within the n-channel MOS device. As shown in FIG. 3, this body diode D2 prevents the voltage Vsw from falling below the threshold of the body diode D2, helping to reduce the ringing at node Nn. However, this still results in power loss, with a resulting loss in efficiency.

One known approach to alleviating this concern is to use a Schottky diode D3 in parallel with the switch S2, the Schottky diode having its cathode connected to node Nn and its anode connected to ground, as shown in FIG. 4. This eliminates the voltage Vsw from falling negative during the third period as shown in FIG. 5, reducing power loss, and increasing efficiency. However, Schottky diodes typically cannot be integrated in very large scale integration (VLSI) processes, and are typically placed as discrete components, adding an undesirable cost to device formation.

Therefore, there is a long felt need in the art to further develop DC-DC boost converters 11 that reduce power loss and increase efficiency, without the use of such Schottky diodes.

A driving system 10 for a MEMS mirror device 14 (e.g., a resonance driven MEMS mirror or a linearly driven MEMS mirror) including the DC-DC boost converter 11 described above is shown in FIG. 6. The driving system 10 may be incorporated within a picoprojector, headset, or depth sensing system. The DC-DC boost converter 11 receives an input voltage Vin and boosts that input voltage to produce an output voltage VBOOST.

The voltage VBOOST is fed as input to a low dropout (LDO) voltage regulator 12, which provides output supply voltage to driver circuitry 13. The driver circuitry 13, using a power supply voltage produced by the LDO voltage regulator 12 and under control of a low voltage drive control signal LV_Drive_Signal, generates a high voltage drive signal HV_Drive_Signal used to drive the MEMS mirror 14.

Keeping in mind that the DC-DC boost converter 11 includes a control loop circuit 15 (as shown in FIG. 4), an example of a known control loop circuit 15 is now described with reference to FIG. 7. The control loop circuit 15 includes an error amplifier 17, which generates an error signal Verr as a function of a difference between the feedback signal Vfbk and a reference voltage Vref. The error signal Verr is fed to the duty cycle modulator 18, which appropriately generates the drive control signal Vdrive for use by the power section 16 (including the diode D1 and switch Sw) of the DC-DC converter in generation of the boosted output voltage VBOOST.

The issue with this design is that conventional duty-cycle modulators 18 are subject to process, voltage, temperature (PVT) variation and their internal circuits may require trimming. In addition, depending upon the variability of the load to be driven by the DC-DC boost converter, the duty-cycle modulator 18 may require additional circuitry, adding undesired complexity.

Therefore, there is also a long felt need in the art to improve the driving of the power section 16 within DC-DC boost converters 11.

As such, development into the area of DC-DC boost converters to produce a DC-DC boost converter meeting both previously described long felt needs is needed.

SUMMARY

Disclosed herein is a device comprising a DC-DC boost converter. The DC-DC boost converter includes: an inductor coupled between an input voltage and an input node; a diode coupled between the input node and an output node; an output capacitor coupled between the output node and ground such that an output voltage is formed across the output capacitor; a switch selectively coupling the input node to ground in response to a drive signal; and control loop circuitry. The control loop circuitry includes: an error amplifier configured to generate an analog error voltage based upon a comparison of a feedback voltage to a reference voltage, the feedback voltage being indicative of the output voltage; a quantizer configured to quantize the analog error voltage to produce a digital error signal; and a drive voltage generation circuit configured to generate the drive signal as having a duty cycle based upon the digital error signal.

The quantizer may be configured to produce the digital error signal as a thermometer code signal. Such thermometer code signal may have a plurality of different possible thermometer code values, with the duty cycle being selected from among a plurality of different possible duty cycles, each of the set plurality of different possible duty cycles being associated with a different one of the set plurality of different possible thermometer code values.

The drive voltage generation circuit may include a digital logic circuit clocked by a local clock, and the quantizer may be clocked by a division of the local clock.

The DC-DC boost converter may be operable in a normal mode in which the drive signal is periodic and has its duty cycle selectively adjusted based upon the digital error signal, and the DC-DC boost converter may be operable in a skip mode in which selected pulses of the drive signal are skipped.

The DC-DC boost converter is operating in the skip mode, the duty cycle of the drive signal is changed based upon the digital error signal only when the digital error signal indicates that the analog error voltage is greater than one half of a full scale voltage of the error amplifier.

The switch may be an NMOS transistor having a drain coupled to the input node, a source coupled to ground, and a gate coupled to receive the drive signal from the drive voltage generation circuit.

Drive circuitry may be powered by the output voltage, and a micromirror may be driven by the drive circuitry.

Also disclosed herein is a device including a DC-DC boost converter, wherein the DC-DC boost converter includes: an inductor coupled between an input voltage and an input node; a diode coupled between the input node and an output node; an output capacitor coupled between the output node and ground such that an output voltage is formed across the output capacitor; a switch selectively coupling the input node to ground in response to a drive signal; and first control loop circuitry. The first control loop circuitry includes a logic circuit configured to: generate pulses of the drive signal as following an input drive signal when a voltage formed at the input node is at least at ground; and generate pulses of the drive signal as being asserted when the voltage formed at the input node is below ground.

The first control loop circuitry may also include: a clamp circuit configured to generate a clamp voltage based upon a voltage formed at the input node; a first comparator configured to assert a first comparison signal when the clamp voltage falls below ground; and a second comparator configured to assert a second comparison signal when the clamp voltage rises above ground.

The logic circuit may be configured to: generate pulses of the drive signal as following the input drive signal when the clamp voltage is at least at ground; and generate pulses of the drive signal as having a first transition when the first comparison signal is asserted and a second transition when the second comparison signal is asserted.

The logic circuit may be further configured to cause the first comparator to continue to assert the first comparison signal for a given period of time, in response to the first comparator detecting that the clamp voltage has fallen below ground, and subsequently cause the second comparator to continue to assert the second comparison signal for a given period of time, in response to the second comparator detecting that the clamp voltage has risen above ground.

The switch may be an NMOS transistor having a drain coupled to the input node, a source coupled to ground, and a gate coupled to receive the drive signal from the drive voltage generation circuit.

Drive circuitry may be powered by the output voltage, and a micromirror may be driven by the drive circuitry.

Second control loop circuitry may be present, and may include: an error amplifier configured to generate an analog error voltage based upon a comparison of a feedback voltage to a reference voltage, the feedback voltage being indicative of the output voltage; a quantizer configured to quantize the analog error voltage to produce a digital error signal; and a drive voltage generation circuit configured to generate the input drive signal as having a duty cycle based upon the digital error signal The quantizer may be configured to produce the digital error signal as a thermometer code signal.

The thermometer code signal may have a plurality of different possible thermometer code values, with the duty cycle being selected from among a plurality of different possible duty cycles, each of the set plurality of different possible duty cycles being associated with a different one of the set plurality of different possible thermometer code values.

The drive voltage generation circuit may include a digital logic circuit clocked by a local clock, and the quantizer may be clocked by a division of the local clock.

The DC-DC boost converter may be operable in a normal mode in which the drive signal is periodic and has its duty cycle selectively adjusted based upon the digital error signal, and the DC-DC boost converter may also be operable in a skip mode in which selected pulses of the drive signal are skipped. When the DC-DC boost converter is operating in the skip mode, the duty cycle of the drive signal may be changed based upon the digital error signal only when the digital error signal indicates that the analog error voltage is greater than one half of a full scale voltage of the error amplifier.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1:
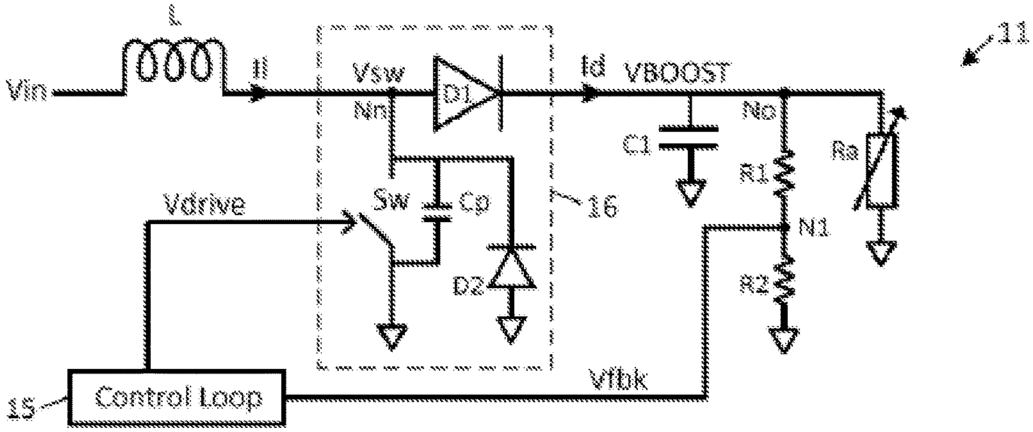
FIG. 1 is a schematic block diagram of a known DC-DC boost converter.
Figure 2:
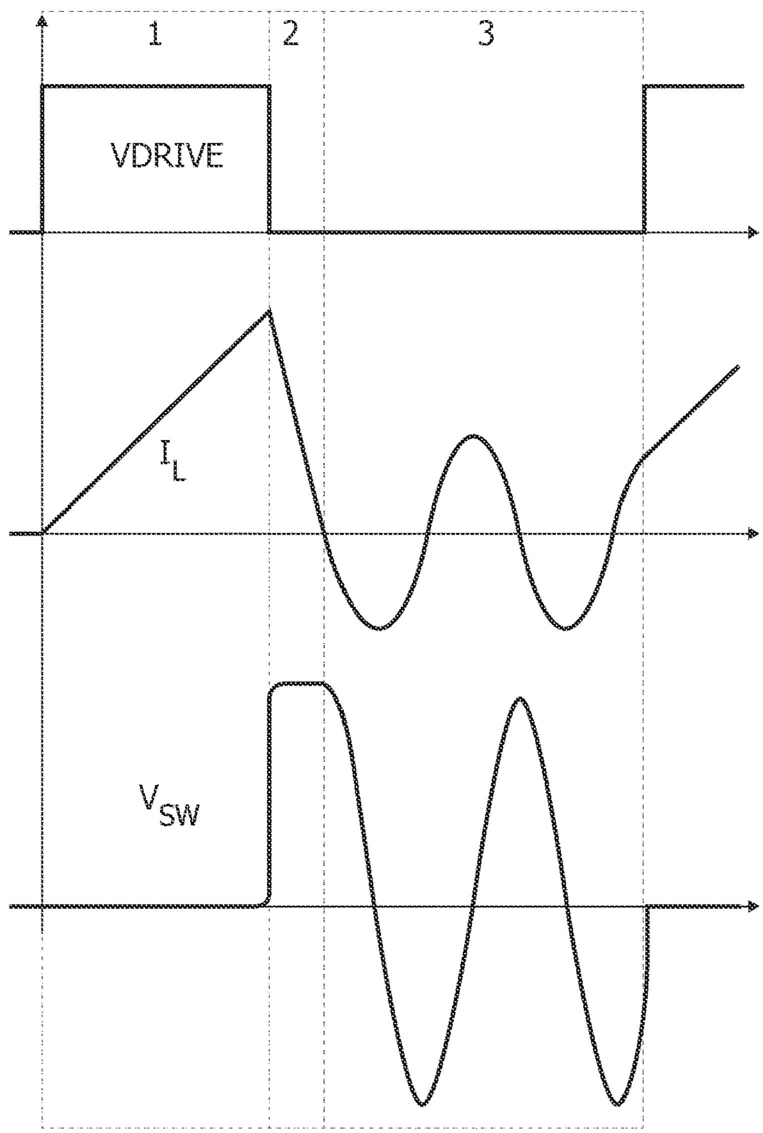
FIG. 2 is a timing diagram showing operation of the DC-DC boost converter of FIG. 1, illustrating a ringing issue that may occur if the diode D2 were not present, said ringing issue causing excessive power dissipation.
Figure 3:
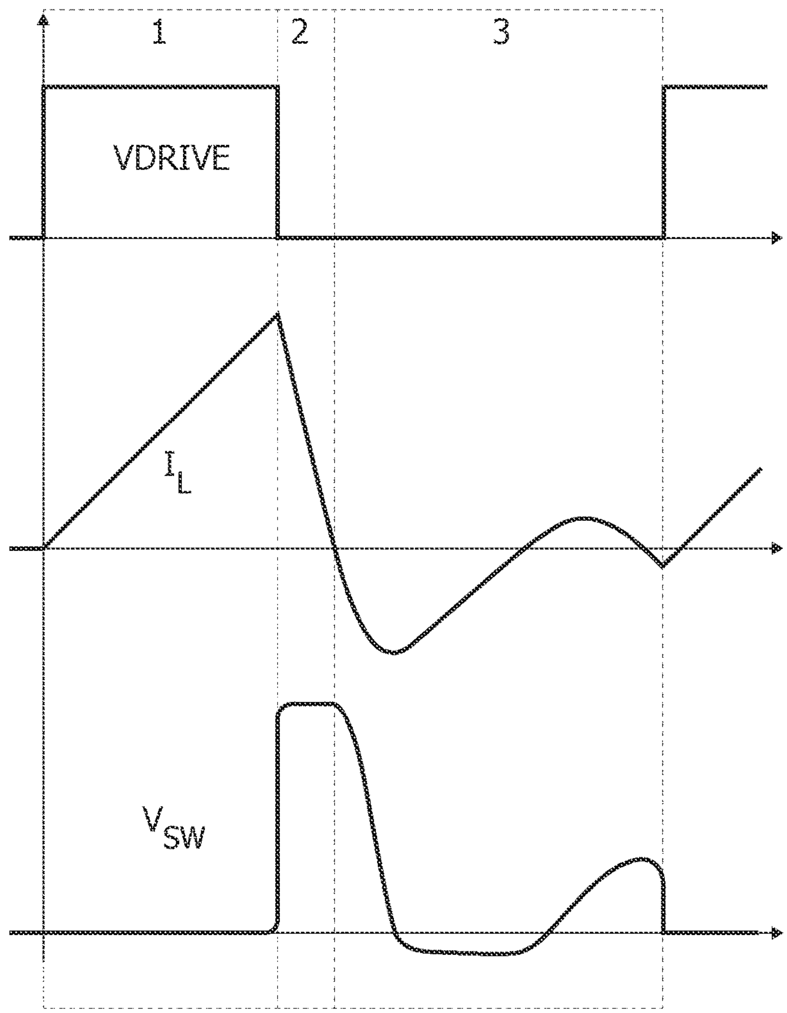
FIG. 3 is a timing diagram showing operation of the DC-DC boost converter of FIG. 1, illustrating a power dissipation issue that may occur even with the presence of the diode D2.
Figure 4:
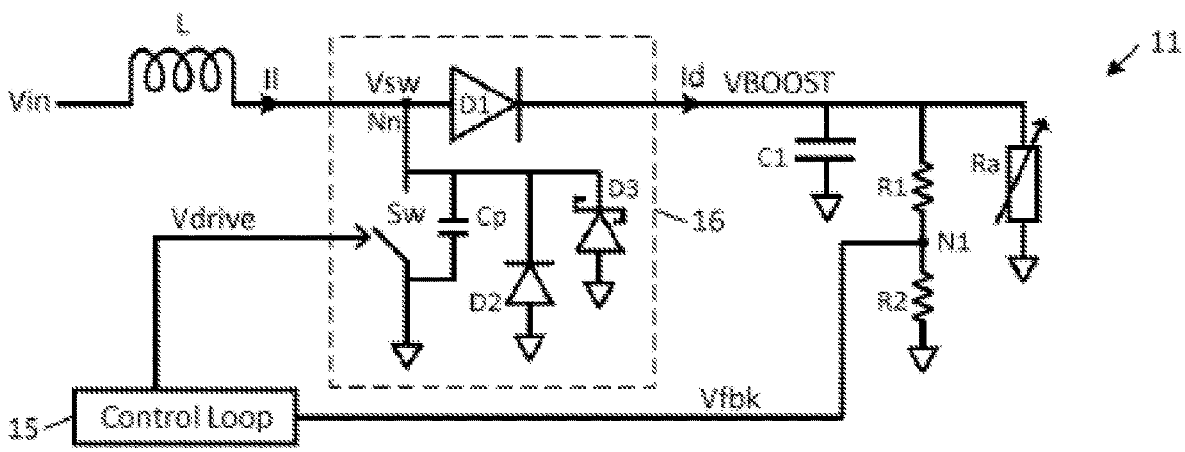
FIG. 4 is a schematic block diagram of a known DC-DC boost converter that addresses the power dissipation issue that occurs with the DC-DC boost converter of FIG. 1.
Figure 5:
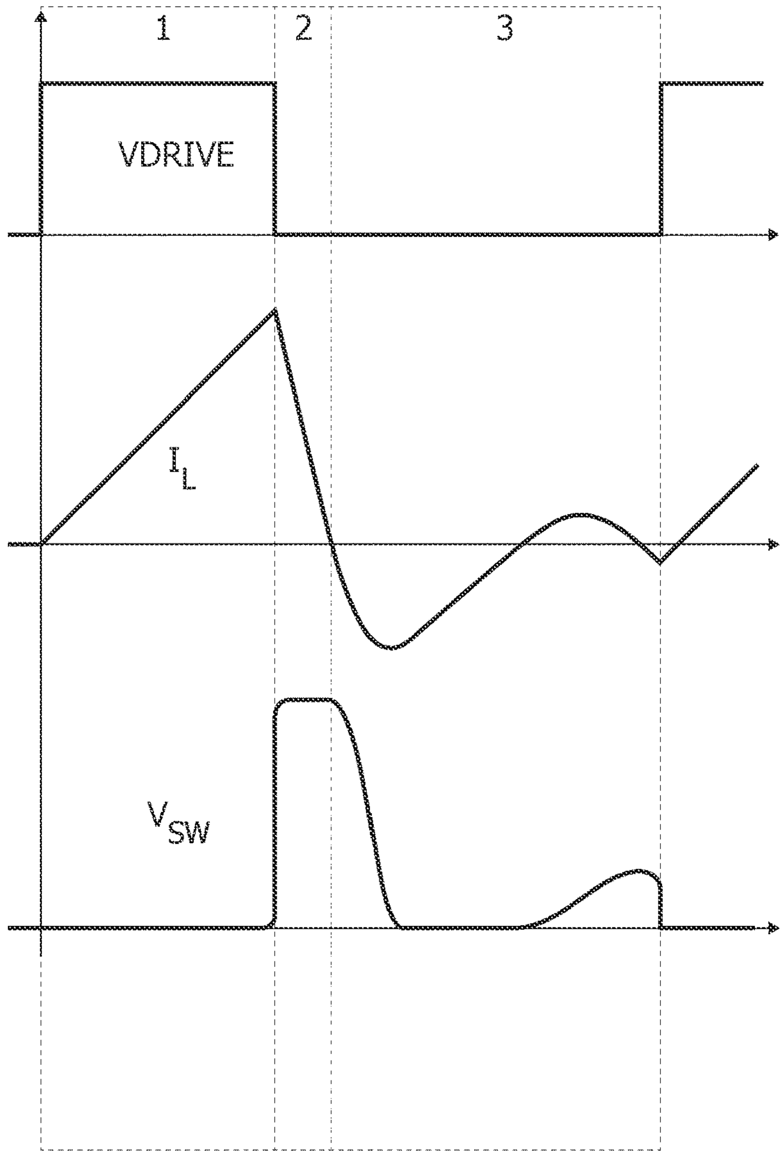
FIG. 5 is a timing diagram showing operation of the DC-DC boost converter of FIG. 4, illustrating correction of the previously described power dissipation issue.
Figure 6:
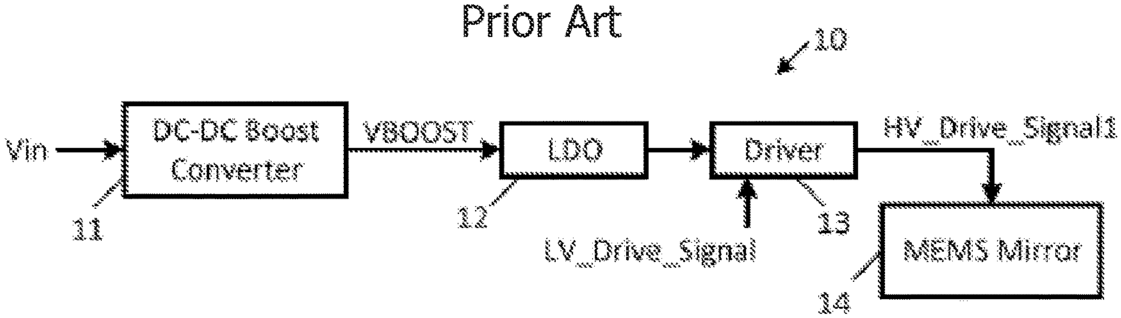
FIG. 6 is a block diagram of a known driving system for a MEMS mirror device, incorporating the DC-DC boost converter of FIG. 4 or FIG. 1.
Figure 7:
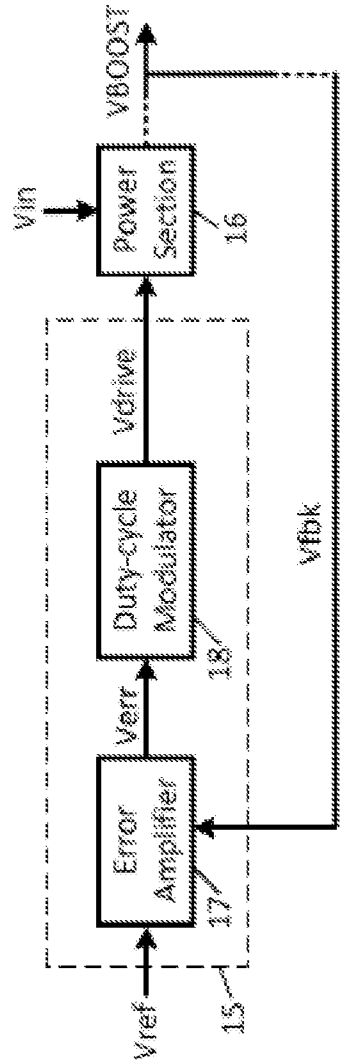
FIG. 7 is a block diagram of a known control loop circuit such as may be used within the driving system of FIG. 6.
Figure 8:
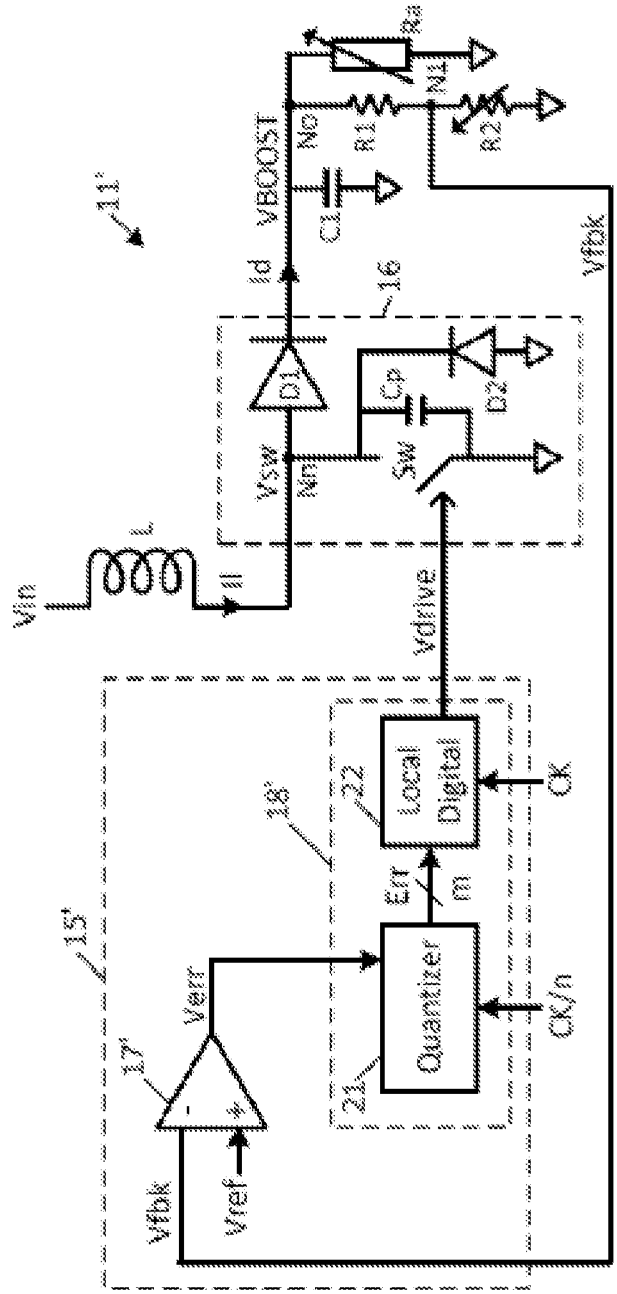
FIG. 8 is a schematic block diagram of an embodiment for a control loop circuit such as may be used within the driving system of FIG. 6.

Now described with reference to FIG. 8 is a control loop circuit 15' for a DC-DC boost converter 11', said control loop circuit 15' having been designed in order to address the issues with prior control loop circuits. The DC-DC boost converter 11' receives an input voltage Vin through an input inductor L, the input inductor L being connected to node Nn, at which a voltage Vsw is produced during operation. Diode D1 is connected between node Nn and a first output capacitor C1 across which a first boosted output voltage VBOOSTL is produced. Switch Sw is connected between node Nn and ground. The switch Sw is operated by a drive control signal Vdrive. The parasitic capacitance of the switch Sw (which may be an n-channel MOS device) is represented as Cp, and the body diode of the switch Sw is represented as diode D2. A resistive divider is formed by resistors R1 and R2 connected in series between a node No (at which the top plate of capacitor C1 is connected) and ground, with a feedback voltage Vfbk being generated at a tap N1 between resistors R1 and R2. The control loop circuit 15' described herein receives the feedback voltage Vfbk, and generates the drive control signal Vdrive for the switch Sw based upon the feedback voltage Vfbk.

The control loop circuit 15' includes an error amplifier 17', shown as an operational amplifier, that receives the feedback voltage Vfbk at its inverting input, receives a reference voltage Vref at its non-inverting input, and generates an analog error signal Verr that is received by a duty-cycle modulation circuit 18'. The duty-cycle modulation circuit 18' includes a quantizer 21' (e.g., an analog to digital converter) operating based upon a clock CK divided by n (so, operating based upon CK/n, which is the effective switching frequency of the boost converter 11') that digitizes the analog error signal Verr to provide a digitized error signal Err, said digitized error signal Err being fed to a local digital block 23 as input.

The digitized error signal Err may be in the form of a thermometer code, for example with m potential values. The local digital block 23 generates the drive control signal Vdrive for use by the power section 16 of the DC-DC boost converter, based upon the digitized error signal Err.

Figure 9:
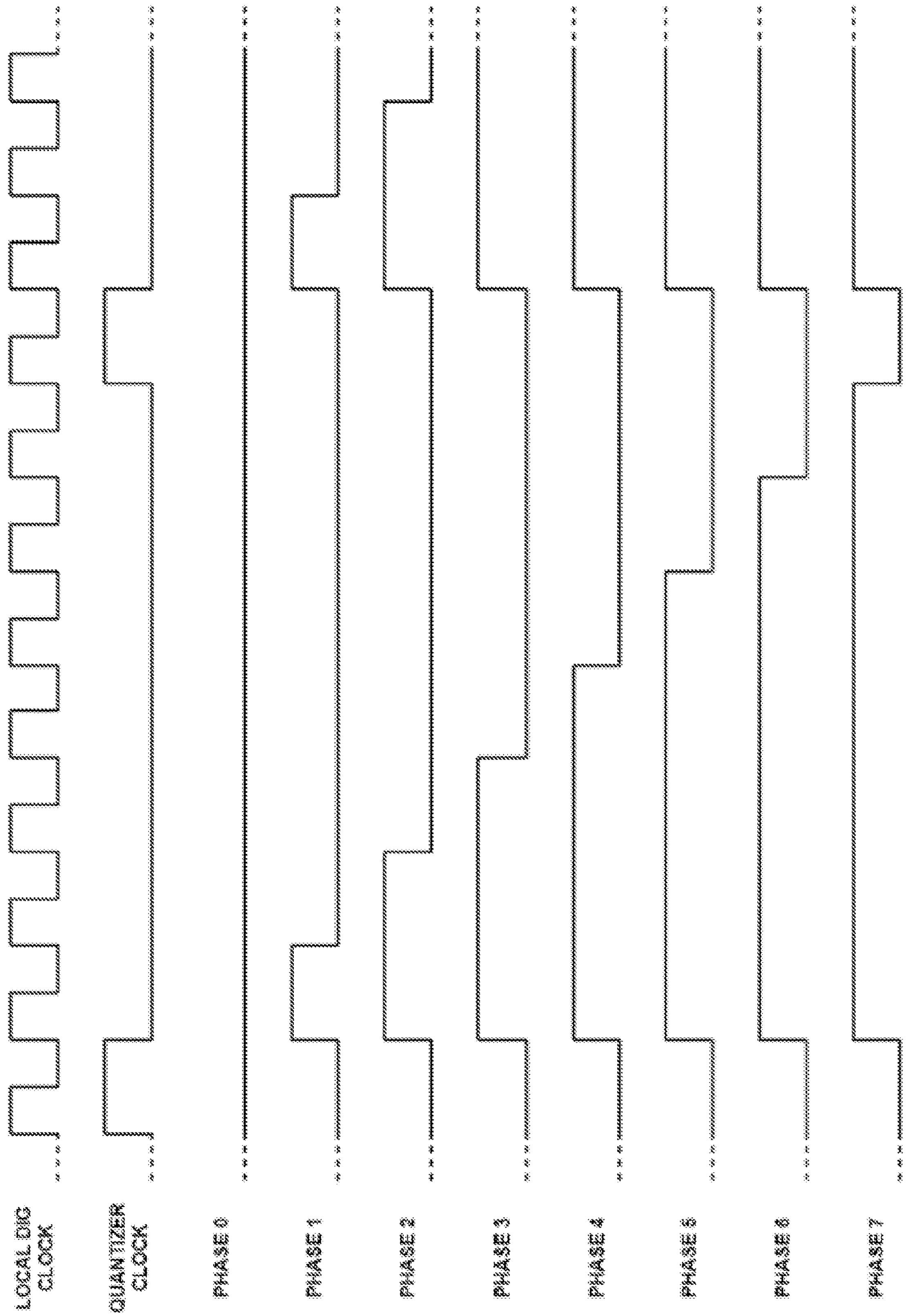
FIG. 9 is a timing diagram showing operation of the control loop circuit of FIG. 8.

Regarding n, consider that an n-level quantizer 21 is used, and that m will be equal to n−1. In the example of FIG. 9, the quantizer 21 is 8-level (n=8), and therefore produces 8 possible driving patterns (phases 0 through 7), which may be, for example, the numbers 0 through 7 represented in binary.

In operation, when the drive control signal Vdrive is asserted, switch Sw closes, connecting node Nn to ground, charging inductor L with inductor current Il, storing energy in the inductor L in the form of a magnetic field. When the drive control signal Vdrive is deasserted, switch Sw opens, the inductor current L falls, and the strength of the magnetic field collapses as the stored energy is converted to current to attempt to maintain the current output from the inductor L. As a result, the voltage across the inductor L becomes in series with the input voltage Vin, providing a boosted voltage Vsw at node Nn. In turn, the diode D1 becomes forward biased, and current is delivered to charge capacitor C1, increasing the voltage VBOOST stored on capacitor C1.

The boosted output voltage VBOOST stored on capacitor C1 is a function of the duty cycle of the drive control signal Vdrive. Operation of the control loop circuit 15' to generate the drive control signal Vdrive and adjust its duty cycle is described with reference to FIG. 9. Notice the local clock CK, with here the quantizer clock being CK/n as described above. During each clock period of the quantizer clock CK/n, the quantizer 21' produces, as the digitized error signal Err, a thermometer code indicative of the analog value Verr output by the error amplifier 17', with the quantizer 21' being an eight level quantizer as stated (but may be any number as selected for a particular given application). The fcode output by the quantizer 21' as the digitized error signal Err causes the local digital block 22 to generate the drive control signal Vdrive having a duty cycle corresponding to the thermometer code. In greater detail, the local digital block 22 converts the thermometer code to a pulse width, and generates Vdrive as having that pulse width.

In this example as shown by the eight potential outputs (labelled as phase 0 through phase 7) of the local digital block 22 as the drive control signal Vdrive are shown. The greater the difference between the reference voltage Vref and the feedback voltage Vfbk, as indicated by the error voltage Verr, the greater the thermometer code produced as the digitized error signal Err. Stated differently, the greater the error voltage Verr, the greater the thermometer code produced as Err, and conversely, the lesser the error voltage Verr, the lesser the thermometer code produced as Err.

When the DC-DC boost converter 11' is operating in normal mode, the local digital block 23 generates the drive control signal Vdrive as having a different duty cycle (e.g., by performing pulse width modulation) for each different value of the thermometer code produced as the digitized error signal Err—the drive control signal Vdrive will have a first duty cycle illustrated as "phase 0" when the thermometer code is at a first value, a second duty cycle illustrated as "phase 1" when the thermometer code is at a second value, a third duty cycle illustrated as "phase 2" when the thermometer code is at a third value, a fourth duty cycle illustrated as "phase 3" when the thermometer code is at a fourth value, a fifth duty cycle illustrated as "phase 4" when the thermometer code is at a fifth value, a sixth duty cycle illustrated as "phase 5" when the thermometer code is at a sixth value, a seventh duty cycle illustrated as "phase 6" when the thermometer code is at a seventh value, and an eighth duty cycle illustrated as "phase 7" when the thermometer code is at an eighth value.

Thus, for example, the duty cycle of the drive control signal Vdrive will be 0% when the thermometer code represented by the digitized error signal Err causes Vdrive to match the illustrated phase 0, the duty cycle of the drive control signal Vdrive will be 12.5% when the thermometer code represented by the digitized error signal Err causes Vdrive to match the illustrated phase 1, the duty cycle of the drive control signal Vdrive will be 25% when the thermometer code represented by the digitized error signal Err causes Vdrive to match the illustrated phase 2, the duty cycle of the drive control signal Vdrive will be 37.5% when the thermometer code represented by the digitized error signal Err causes Vdrive to match the illustrated phase 3, the duty cycle of the drive control signal Vdrive will be 50% when the thermometer code represented by the digitized error signal Err causes Vdrive to match the illustrated phase 4, the duty cycle of the drive control signal Vdrive will be 62.5% when the thermometer code represented by the digitized error signal Err causes Vdrive to match the illustrated phase 5, the duty cycle of the drive control signal Vdrive will be 75% when the thermometer code represented by the digitized error signal Err causes Vdrive to match the illustrated phase 6, and the duty cycle of the drive control signal Vdrive will be 87.5% when the thermometer code represented by the digitized error signal Err causes Vdrive to match the illustrated phase 7.

When the DC-DC boost converter is operating in skip mode, the duty cycle of the drive control voltage signal Vdrive is forced to match a programmed phase indicated by the thermometer code represented by the digitized error signal Err when the digitized error signal Err is greater than FS/2, with FS being the full scale (e.g., maximum) value that the error amplifier 17' is capable of outputting.

Through this changing of the duty cycle of the drive control signal Vdrive, the boosted output voltage VBOOST is adjusted to reach and maintain a desired value. The higher the duty cycle of the drive control signal Vdrive, the more power stored in the inductor L, the higher the boosted output voltage VBOOST.

The advantages of the control loop circuit 15' are numerous, including high configurability to produce different desired boosted output voltages VBOOST, insensitivity to PVT variation due to determination of the duty cycle of the drive control signal Vdrive in the digital domain, ease of power-up, soft-start, and power-off due to the determination of the duty cycle of the drive control signal Vdrive in the digital domain, and no need for trimming analog components.

Regarding the local digital block 22, it should be understood that it performs the generation and management of the phases, as described above, based upon the quantizer status. The thermometric code represents a suitable choice for the quantizer 21 to output, as it is using a reduced number of bits (e.g., 7 bits thermometric, which is 3 bits of binary). If it is desired to increase the resolution of the quantizer 21, the quantizer type may be changed to suit the desired application.

Figure 10:
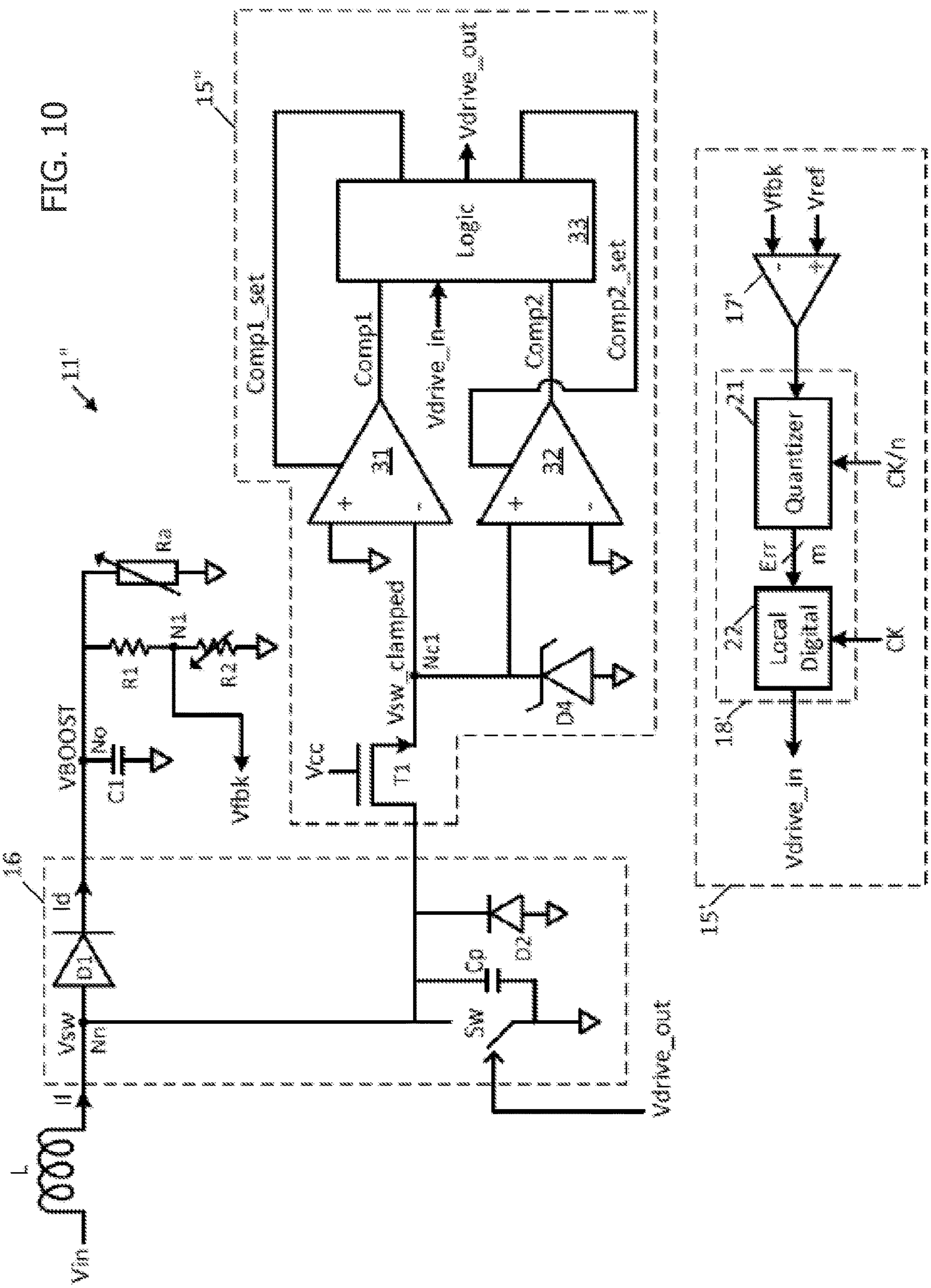
FIG. 10 is a schematic block diagram of another embodiment for a control loop circuit such as may be used within the driving system of FIG. 6.

Now described with reference to FIG. 10 is a drive enhancement circuit 15" for a DC-DC boost converter 11", said drive enhancement circuit 15" devised in order to address the issues with prior control loop circuits, is now described. As shown in FIG. 10, the drive enhancement circuit 15" may be used together with the control loop circuit 15', with the control loop circuit 15' having the purpose of maintenance of the output voltage at a stable desired value, and the drive enhancement circuit 15" having the purpose of increasing boost efficiency. The signal Vdrive in is generated by the control loop circuit 15', and the signal Vdrive_out (used to operate the switch Sw) is generated by the drive enhancement circuit 15".

The DC-DC boost converter 11" itself is the same as the DC-DC boost converter 11' described above and therefore needs no further description herein; it is the drive enhancement circuit 15" here that is added and will be described.

Figure 11:
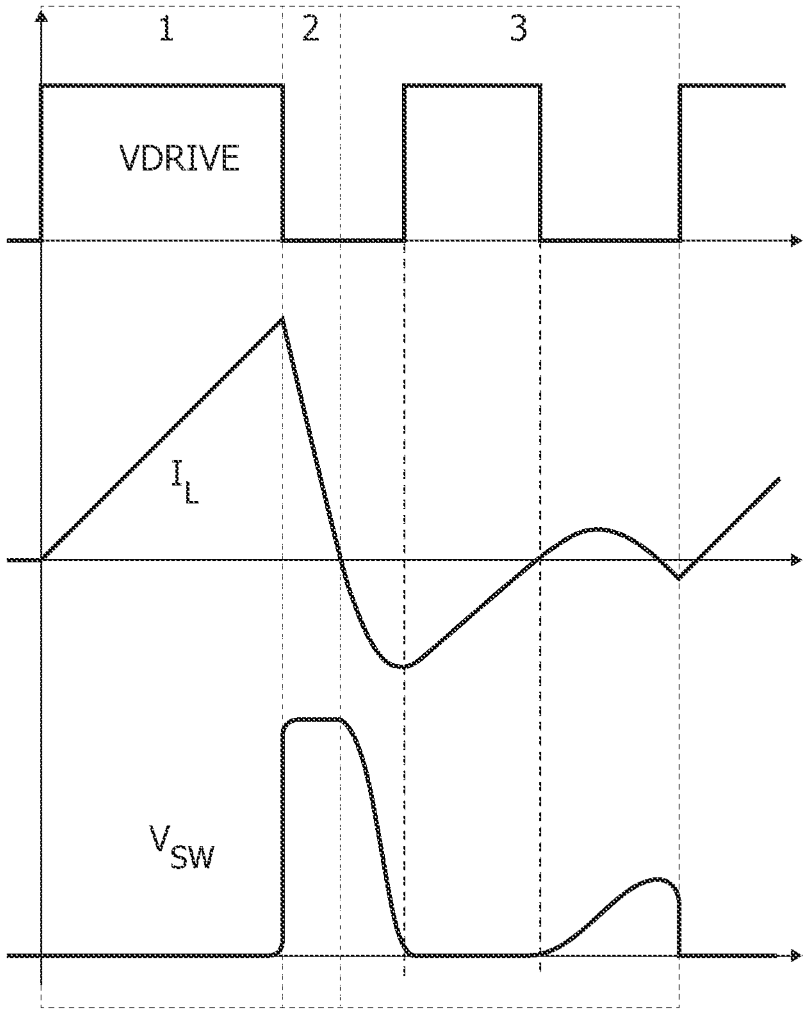
FIG. 11 is a simplified timing diagram showing desired operation of the control loop circuit of FIG. 10.

The goal of the drive enhancement circuit 15" is as follows, as described with additional reference to FIG. 11. When the voltage Vsw falls below 0 V, which would occur during the third time period, the drive control signal Vdrive_out is modified by the drive enhancement circuit 15" such that the drive control signal Vdrive_out closes the switch Sw during this third time period, strongly reducing the voltage drop across the switch Sw, minimizing power dissipation, and therefore increasing efficiency.

The drive enhancement circuit 15" is now described in detail, referring back to FIG. 10. The drive enhancement circuit 15" includes an n-channel transistor T1 having its drain connected to node Nn, its source connected to node Nc1, and its gate connected to a supply voltage Vcc. A Zener diode D4 has its cathode connected to node Nc1 and its anode connected to ground. A first comparator 31 has its non-inverting input connected to ground, its inverting input coupled to node Nc1, and its output connected to a first input of a logic circuit 33. The first comparator 31 has a set input receiving a set voltage Comp1_set, with the set voltage Comp1_set being received from a first output of the logic circuit 33. A second comparator 32 has its inverting input connected to ground, its non-inverting input connected to node Nc1, and its output connected to a third input of the logic circuit 33. The second comparator 32 has a set input receiving a set voltage Comp2_set and ground, with the set voltage Comp2_set being received from a third output of the logic circuit 33. The logic circuit 33 has a second input receiving the drive control input signal Vdrive_in from the control loop circuit 15', and a second output generating the drive control signal Vdrive_out.

Figure 12:
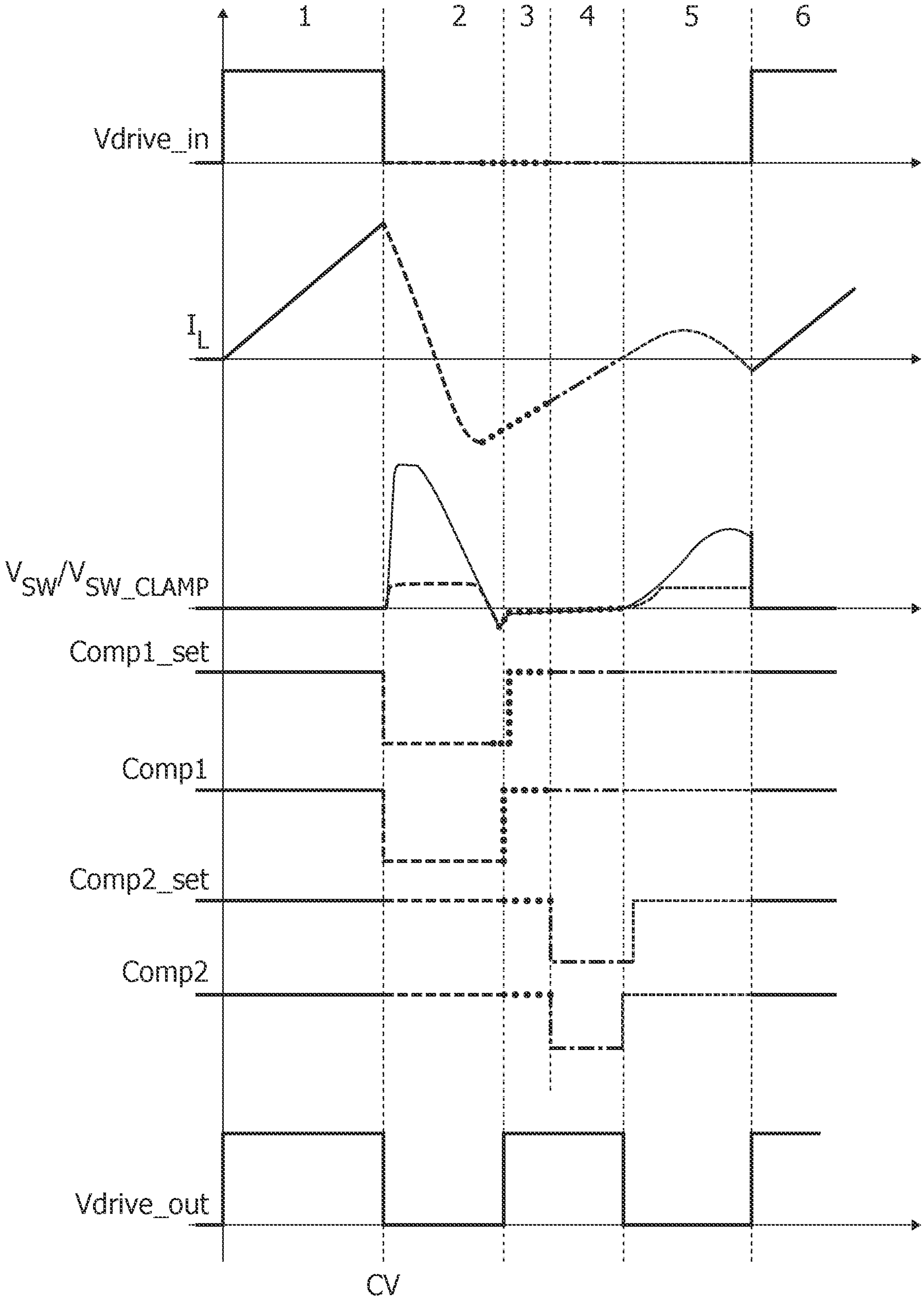
FIG. 12 is a detailed timing diagram showing operation of the control loop circuit of FIG. 10.

Operation in detail is now described with additional reference to FIG. 12. During the first time period, the drive control input signal Vdrive_in is asserted, and the logic circuit 33 asserts the drive control voltage Vdrive_out accordingly, closing switch Sw, connecting node Nn to ground, charging inductor L with inductor current Il, storing energy in the inductor L in the form of a magnetic field. At the beginning of the second time period, the drive control input signal Vdrive_in is deasserted, and the logic circuit deasserts the drive control voltage Vdrive accordingly. As a result, Sw opens, the inductor current L falls, the strength of the magnetic field collapses as the stored energy is converted to current to attempt to maintain the current output from the inductor L, and the voltage across the inductor L becomes in series with the input voltage Vin, providing a boosted voltage Vsw at node Nn. In turn, the diode D1 becomes forward biased, and current is delivered to charge capacitor C1, increasing the voltage VBOOST stored on capacitor C1.

Note that the n-channel transistor T1 clamps the voltage Vsw to produce a clamped voltage Vsw_clamped. At the beginning of the third time period, the clamped voltage Vsw_clamped falls below ground, meaning that the body diode D2 would otherwise become forward biased, allowing for the LC circuit formed by the inductor and parasitic capacitance Cp of the switch Sw to cause ringing, resulting in power dissipation.

However, this does not occur in the design of the drive enhancement circuit 15" because when the clamped voltage Vsw_clamped falls below ground at the beginning of the third time period, the comparator 31 asserts the Comp1 signal at its output. In response to the Comp1 signal being asserted to indicate that Vsw_clamped has fallen below ground, the logic circuit 33 asserts the Comp1_set signal, freezing the comparator 31 output Comp1, and the logic circuit 33 asserts the drive control voltage Vdrive_out to thereby close the switch Sw, greatly reducing the resistance across the switch Sw, preventing the LC circuit from forming, preventing the body diode D2 from becoming forward biased. At this point, the logic circuit 33 also deasserts the Comp2_set signal, enabling the output of the comparator 32 to change. Since at this point the clamped voltage Vsw_clamped is below ground, the comparator 32 accordingly deasserts the Comp2 signal at its output during the third time period. In response to the Comp2 signal being asserted to indicate that Vsw_clamped has risen above ground at the end of the fourth time period, the logic circuit deasserts the drive control voltage Vdrive_out, opening the switch Sw. Also, the logic circuit 33 asserts the Comp2_set signal, freezing the comparator 32 output Comp2.

To explain the state of the drive control voltage Vdrive_out differently, the logic circuit 33 asserts the drive control voltage Vdrive_out between the rising edge of Comp1 at the beginning of the third time period and the rising edge of Comp2 at the end of the fourth time period. Thus, the drive control voltage Vdrive_out is asserted during the time at which the clamped voltage Vsw_clamped (and therefore the voltage Vsw) is below ground, and otherwise follows the drive control input signal Vdrive_in.

Beginning in the fifth time period, the formation of a LC circuit from the inductance of the inductor L and the parasitic capacitance Cp of the switch Sw is restored (since switch Sw is open), but since the body diode D2 remains reverse biased (since Vsw is greater than ground, as can be seen in FIG. 12), there is not an issue as ringing and its associated power dissipation is not occurring.

The next boost cycle begins at the beginning of the sixth time period. Understand that at the next falling edge of Vdrive_in, the comparator 31 is unfrozen, permitting the restart of the different operations described above.

Finally, it is clear that modifications and variations may be made to what has been described and illustrated herein, without thereby departing from the scope of this disclosure, as defined in the annexed claims. For example, the above-described circuits and techniques may be used with boost and buck converters working in discontinuous conduction mode (DCM).

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A device comprising a DC-DC boost converter, wherein the DC-DC boost converter comprises:

an inductor coupled between an input voltage and an input node;

a diode coupled between the input node and an output node;

an output capacitor coupled between the output node and ground such that an output voltage is formed across the output capacitor;

a switch selectively coupling the input node to ground in response to a drive signal; and control loop circuitry comprising:

an error amplifier configured to generate an analog error voltage based upon a comparison of a feedback voltage to a reference voltage, the feedback voltage being indicative of the output voltage;

a quantizer configured to quantize the analog error voltage to produce a digital error signal; and a drive voltage generation circuit configured to generate the drive signal as having a duty cycle based upon the digital error signal;

wherein the DC-DC boost converter is operable in a normal mode in which the drive voltage generation circuit generates the drive signal as periodic with the duty cycle thereof selectively adjusted based upon the digital error signal; and wherein the DC-DC boost converter is operable in a skip mode in which the drive voltage generation circuit skips generation of selected pulses of the drive signal with the duty cycle thereof being changed based upon the digital error signal only when the digital error signal indicates that the analog error voltage is greater than one half of a full scale voltage of the error amplifier.

2. The device of claim 1, wherein the quantizer is configured to produce the digital error signal as a thermometer code signal.

3. The device of claim 2, wherein the thermometer code signal has a plurality of different possible thermometer code values, with the duty cycle being selected from among a plurality of different possible duty cycles, each of the plurality of different possible duty cycles being associated with a different one of the plurality of different possible thermometer code values.

4. The device of claim 1, wherein the drive voltage generation circuit comprises a digital logic circuit clocked by a local clock; and wherein the quantizer is clocked by a division of the local clock.

5. The device of claim 1, wherein the switch comprises an NMOS transistor having a drain coupled to the input node, a source coupled to ground, and a gate coupled to receive the drive signal from the drive voltage generation circuit.

6. The device of claim 1, further comprising drive circuitry powered by the output voltage, and a micromirror driven by the drive circuitry.

7. A device comprising a DC-DC boost converter, wherein the DC-DC boost converter comprises:

an inductor coupled between an input voltage and an input node;

a diode coupled between the input node and an output node;

an output capacitor coupled between the output node and ground such that an output voltage is formed across the output capacitor;

a switch selectively coupling the input node to ground in response to a drive signal; and first control loop circuitry comprising:

a clamp circuit configured to generate a clamp voltage based upon a voltage formed at the input node;

a first comparator configured to assert a first comparison signal when the clamp voltage falls below a ground voltage;

a second comparator configured to assert a second comparison signal when the clamp voltage rises above the ground voltage; and a logic circuit configured to:

generate first pulses of the drive signal as corresponding to pulses of an input drive signal when the clamp voltage is at least at the ground voltage; and generate second pulses of the drive signal as having a first transition when the first comparison signal is asserted and a second transition when the second comparison signal is asserted.

8. The device of claim 7, wherein the logic circuit is further configured to cause the first comparator to continue to assert the first comparison signal for a given period of time, in response to the first comparator detecting that the clamp voltage has fallen below the ground voltage, and subsequently cause the second comparator to continue to assert the second comparison signal for a given period of time, in response to the second comparator detecting that the clamp voltage has risen above the ground voltage.

9. The device of claim 7, wherein the switch comprises an NMOS transistor having a drain coupled to the input node, a source coupled to the ground voltage, and a gate coupled to receive the drive signal from the drive voltage generation circuit.

10. The device of claim 7, further comprising drive circuitry powered by the output voltage, and a micromirror driven by the drive circuitry.

11. The device of claim 7, further comprising second control loop circuitry comprising:

an error amplifier configured to generate an analog error voltage based upon a comparison of a feedback voltage to a reference voltage, the feedback voltage being indicative of the output voltage;

a quantizer configured to quantize the analog error voltage to produce a digital error signal; and a drive voltage generation circuit configured to generate the input drive signal as having a duty cycle based upon the digital error signal.

12. The device of claim 11, wherein the quantizer is configured to produce the digital error signal as a thermometer code signal.

13. The device of claim 12, wherein the thermometer code signal has a plurality of different possible thermometer code values, with the duty cycle being selected from among a plurality of different possible duty cycles, each of the plurality of different possible duty cycles being associated with a different one of the plurality of different possible thermometer code values.

14. The device of claim 11, wherein the drive voltage generation circuit comprises a digital logic circuit clocked by a local clock; and wherein the quantizer is clocked by a division of the local clock.

15. The device of claim 11, wherein the DC-DC boost converter is operable in a normal mode in which the drive signal is periodic and has its duty cycle selectively adjusted based upon the digital error signal; and wherein the DC-DC boost converter is operable in a skip mode in which selected pulses of the drive signal are skipped.

16. The device of claim 15, wherein, when the DC-DC boost converter is operating in the skip mode, the duty cycle of the drive signal is changed based upon the digital error signal only when the digital error signal indicates that the analog error voltage is greater than one half of a full scale voltage of the error amplifier.

* * * * *